(12) United States Patent
Ryu

(10) Patent No.: US 8,582,280 B2
(45) Date of Patent: Nov. 12, 2013

(54) FOLDABLE KEYBOARD FOR PORTABLE COMPUTER

(76) Inventor: Sang Kyu Ryu, Uiwang-si (KR)

( * ) Notice: Subject to any disclaimer, the term of this patent is extended or adjusted under 35 U.S.C. 154(b) by 494 days.

(21) Appl. No.: 12/812,599

(22) PCT Filed: Jan. 9, 2009

(86) PCT No.: PCT/KR2009/000117
§ 371 (c)(1),
(2), (4) Date: Jul. 12, 2010

(87) PCT Pub. No.: WO2009/088245
PCT Pub. Date: Jul. 16, 2009

(65) Prior Publication Data
US 2010/0289748 A1    Nov. 18, 2010

(30) Foreign Application Priority Data

| Jan. 11, 2008 | (KR) | ................... 20-2008-0000481 U |
| Jan. 11, 2008 | (KR) | ................... 20-2008-0000482 U |
| Jun. 2, 2008  | (KR) | ................... 10-2008-0051686 |
| Jun. 2, 2008  | (KR) | ................... 10-2008-0051687 |

(51) Int. Cl.
*G06F 1/16*    (2006.01)

(52) U.S. Cl.
USPC .................. 361/679.14; 361/679.15; 345/169

(58) Field of Classification Search
USPC ................ 345/169; 361/679.14, 679.15, 749
See application file for complete search history.

(56) References Cited

U.S. PATENT DOCUMENTS

| 5,267,127 A | 11/1993 | Pollitt |
| 5,410,333 A * | 4/1995 | Conway ........................ 345/169 |
| 5,646,817 A | 7/1997 | Manser |
| 5,841,635 A | 11/1998 | Sadler |
| 5,982,612 A * | 11/1999 | Roylance ................. 361/679.14 |
| 5,996,652 A | 12/1999 | Schromm |
| 7,104,715 B2 * | 9/2006 | Lahr ............................. 400/693 |
| 7,193,614 B2 * | 3/2007 | Bullister ....................... 345/168 |
| 2006/0034434 A1 | 2/2006 | Kashi |

FOREIGN PATENT DOCUMENTS

| CN | 1622563       | 6/2005 |
| JP | 2003-216305   | 7/2003 |
| JP | 2003-288149   | 10/2003 |
| KR | 10-2007-0056213 | 6/2007 |
| WO | 2007107867    | 9/2007 |

OTHER PUBLICATIONS

International Search Report for PCT/KR2009/000117 mailed Aug. 17, 2009.

* cited by examiner

*Primary Examiner* — Latanya Bibbins
(74) *Attorney, Agent, or Firm* — Christopher Paul Mitchell

(57) ABSTRACT

A foldable keyboard for a portable computer includes a keyboard body which comprises two keyboard pieces hinge-coupled by a hinge unit in order to be unfolded in a direction parallel to a keyboard plane. Another embodiment of the invention is a foldable keyboard, which includes: a guide unit at which a long hole is formed along its length; and a keyboard body which comprises two keyboard pieces hinge-coupled to the guide unit by a hinge unit. The keyboard pieces can be unfolded in a direction parallel to a keyboard plane into its extended state. As the keyboard pieces unfold, the hinge unit slides along the long hole as the keyboard edges, which are facing each other, are stuck together. Thus, the two keyboard pieces are hinge-coupled to each other to reverse their vertical and horizontal directions as the keyboard body is extended.

16 Claims, 4 Drawing Sheets

FOLDABLE KEYBOARD FOR PORTABLE COMPUTER

RELATED APPLICATIONS

This application is a 371 application of International Application No. PCT/KR2009/000117, filed Jan. 9, 2009, which in turn claims priority from Korean Patent Application Nos. 10-2008-0051687, filed Jun. 2, 2008, 10-2008-0051686, filed Jun. 2, 2008, 20-2008-0000482, filed Jan. 11, 2008, and 20-2008-0000481, filed Jan. 11, 2008, all of which are incorporated herein by reference in their entireties.

TECHNICAL FIELD

The present invention relates to a foldable keyboard for a portable computer, in more detail, a foldable keyboard for a portable computer which is mounted in portable computers, such as UMPC (Ultra Mobile PC), expandable to provide convenience for users.

BACKGROUND ART

It is difficult to reduce the size of keyboards widely used for input devices of computers, for the structure with a plurality of massed keys, including Korean/English character keys, number keys, symbol keys, and function keys. Even if they are manufactured in a small size, it is difficult to input data, due to the size of the general user's hands.

In particular, for portable microcomputers rapidly rising in demand in recent years, such as UMPC, a display of 10 inches or less is usually mounted and the integral keyboard mounted in the main body is provided in a very small size, such that the it is inconvenience to use the computer and is required to improve the structure of the keyboard. Removable keyboards that are connected by USBs (Universal Serial Bus) etc. are used to solve the inconvenience of the integral keyboards; however, it is inconvenience to carry the removable keyboards and required to be careful of handling them because there is possibility of loss.

In consideration of improvement of the keyboard structure, a keyboard having a structure in which a housing is formed at both side of the main body of a keyboard to accommodate sub-keyboards and the sub-keyboards are taken out and connected to the sides of the main body of the keyboard for use is disclosed in Korean Utility Model Publication No. 1995-25665. This sectional keyboard, however, the terminals for electric connection between the main body of the keyboard and the sub-keyboards are worn or exposed to foreign substances due to frequent connection/disconnection, such that bad connection may be caused.

For another example, keyboards that can increase in size, using foldable structure is disclosed in Korea Patent Publication No. 1998-28435 (Portable computer having a foldable keyboard) and Korea Utility Model Publication No. 1999-001643 (Foldable keyboard structure for portable computer). The keyboards disclosed in the documents use a foldable structure for folding the parts of the keyboards and developing them for use. However, this structure increases the entire thickness when being folded, such that it is difficult to achieve a thin portable computer.

Technical Problem

It is an object of the present invention to provide a foldable keyboard for a portable computer, in which the keyboard is divided in two foldable pieces, which can be developed without changing the thickness of the keyboard to increase the entire size.

Technical Solution

In order to achieve the object of the present invention, a swing-typed foldable keyboard for a portable computer includes: a keyboard body composed of two keyboard pieces hinge-coupled to each other to be developed to the left and right in parallel with the keyboard surface, in which the keyboard pieces are hinge-coupled such that the width and the length are exchanged in developing.

The swing-typed foldable keyboard for a portable computer may further include a connector selectively connecting/disconnecting the keyboard body to/from the main body of the portable computer.

One end of the connector may be fixed to the hinge unit and inserted in the main body through one side of the main body.

Alternatively, the connector may be a multistep pipe having one end fixed to the hinge unit and the other end fixed to one side of the main body to be adjustable in length.

It is preferable that the two keyboard pieces of the keyboard body are formed in substantially rectangles having the same area, such that the entire width of the keyboard that is fully developed with respect to the hinge unit is two times the entire length of the keyboard fully folded.

It is preferable that the two keyboard pieces of the keyboard body are hinge-coupled, with corners facing each other connected by the hinge unit.

According to another aspect of the present invention, a foldable keyboard for a portable computer includes: a guide having a long slot longitudinally formed; and a keyboard body composed of two keyboard pieces hinge-coupled to the guide by different hinge units to be developed to the left and right in parallel with the keyboard surface, the hinge units being connected slidably along the slot such that the edges facing each other are in closed contact with each other by sliding the two keyboard pieces in fully developing, in which the keyboard pieces are hinge-coupled such that the width and the length are exchanged in developing.

It is preferable that the guide is fixed to the lower edge of the main body of the portable computer with a display unit, and has a length corresponding to the low edge of the main body.

It is preferable that two keyboard pieces of the keyboard body are formed in substantially rectangles having the same area, such that the entire width of the keyboard that is fully developed with respect to the hinge units and slide to be in contact is two times the entire length of the keyboard fully folded.

Preferably, the outer corner of each other keyboard pieces may be connected to the hinge unit.

It is preferable that a head having a diameter larger than the width of the slot is formed at both ends of the hinge unit.

According to another aspect of the present invention, a foldable keyboard equipped to a portable computer having guide with a long slot, includes: a keyboard body composed of two keyboard pieces hinge-coupled to the guide by different hinge units to be developed to the left and right in parallel with the keyboard surface, the hinge units being connected slidably along the slot such that the edges facing each other are in closed contact with each other by sliding the two keyboard pieces in fully developing, in which the keyboard pieces are hinge-coupled such that the width and the length are exchanged in developing.

BRIEF DESCRIPTION OF THE DRAWING

The accompanying drawings are provided to illustrate preferred embodiments of the present invention and make the spirit of the present invention clearer with the following detailed description, and it should be understood that the present invention is construed as not being limited only to the drawings.

Figure 1:
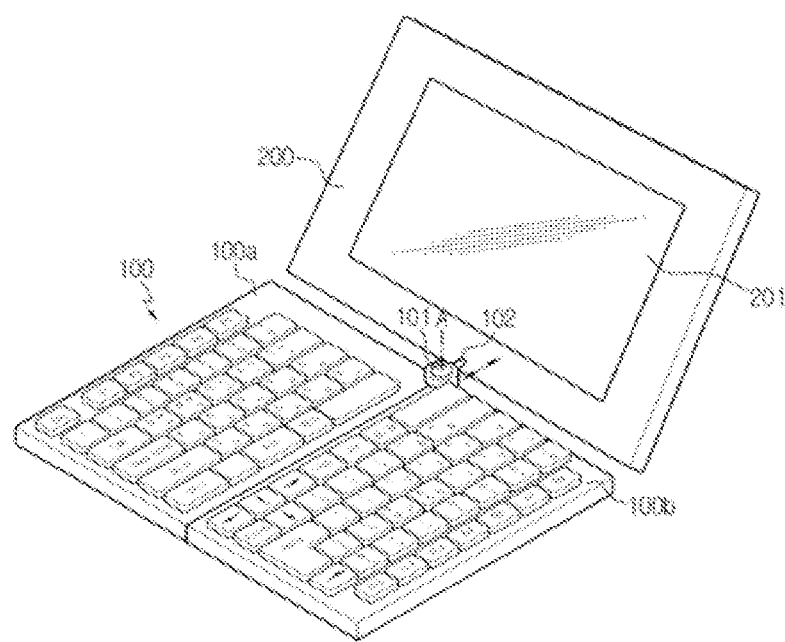
FIG. 1 is a perspective view showing the configuration of a swing-typed foldable keyboard according to a preferred embodiment of the present invention.

REFERENCE NUMERALS 100, 300: keyboard body 101, 301: hinge unit
102, 102': connector 200: main body
201: display unit 301a: head
302: guide 302a: slot

BEST MODE FOR THE INVENTION

Preferred embodiments of the present invention are described hereafter in detail with reference to the accompanying drawings. Before describing the embodiments, the words and terminologies used in the specification and claims should not be construed with common or dictionary meanings, but construed as meanings and conception coinciding the spirit of the invention under a principle that the inventor(s) can appropriately define the conception of the terminologies to explain the invention in the optimum method. Therefore, embodiments described in the specification and the configurations shown in the drawings are not more than the most preferred embodiments of the present invention and do not fully cover the spirit of the present invention. Accordingly, it should be understood that there may be various equivalents and modifications that can replace those when this application is filed.

Figure 2:
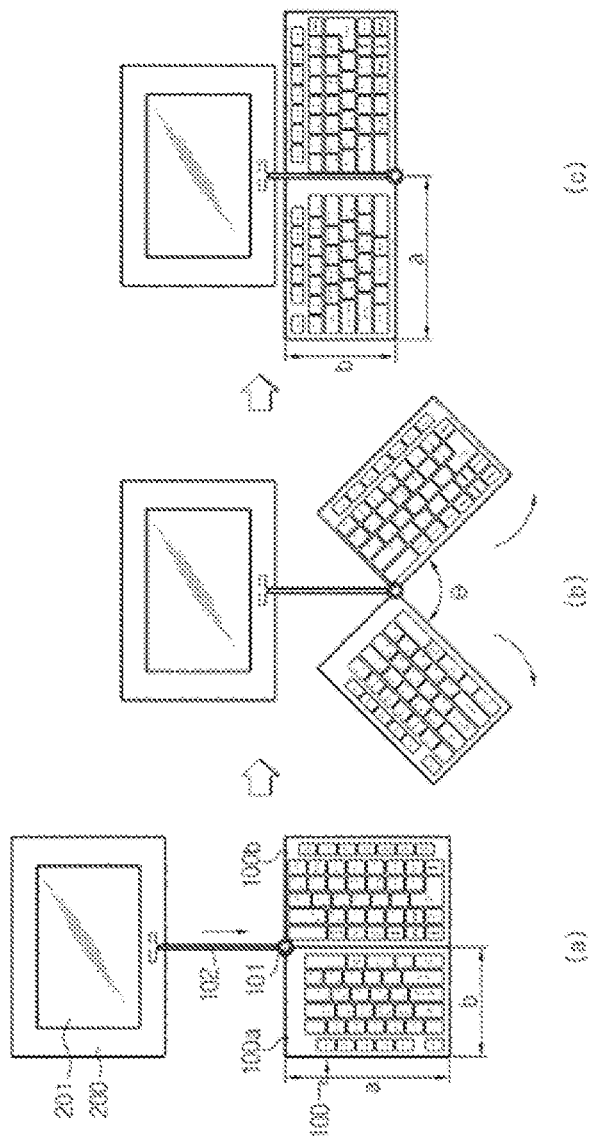
FIG. 2 is a plan view illustrating the operation of the swing-typed foldable keyboard shown in FIG. 1.

FIGS. 1 and 2 show the configuration and the operation of a swing-typed foldable keyboard according to a preferred embodiment of the present invention.

Referring to FIGS. 1 and 2, a swing-typed foldable keyboard according to a preferred embodiment of the present invention includes: a keyboard body 100 composed of two hinge-coupled keyboard pieces 100a, 100 to be developed in parallel with the keyboard surface; and a connector 102 mechanically connecting a main body 200 of a portable computer with the keyboard body 100. In this configuration, the keyboard surface implies a plane of the keyboard where a plurality of keys is concentrated, including Korean/English character keys, number keys, symbol keys, and function keys.

Although a structure in which the main body 200 of the portable computer is provided at a display unit 201 and the foldable keyboard is connected to the main body 200 is shown in the figures, the present invention is not limited thereto and may be modified such that the configuration of the main body 200 is mounted on the keyboard body 100 and the keyboard body 100 is connected to the display unit 201. Hereinafter, the configuration of the present invention is described by way of an example when the main body 200 is provided at the display unit 201.

The two keyboard pieces 100a, 100b of the keyboard body 100 are hinge-coupled with corners facing each other connected by a hinge unit 101. In this configuration, the direction of the hinge axis A of the hinge unit 101 is parallel with a normal of the keyboard surface, such that the two keyboard pieces 100a, 100b are developed in parallel with the keyboard surface.

The keyboard pieces 100a, 100b are fully developed while turning preferably at a joint angle θ of 180° with respect to the hinge unit 101. Therefore, the width and length are exchanged after the keyboard pieces 100a, 100b are developed. That is, when the width and length of the keyboard pieces 100a, 100b are 'b' and 'a', respectively, before developing, the width and the length of the keyboard pieces 100a, 100b become 'a' and 'b', respectively.

The two keyboard pieces 100a, 100b of the keyboard body 100 are formed in substantially rectangles having the same area. Therefore, the entire width of the keyboard that is fully developed with respect to the hinge unit 101 is two times the entire length of the keyboard fully folded.

It is preferable that one side of the keyboard contacts the lower edge of the main body 200, when fully developing with respect to the hinge unit 101.

Figure 3:
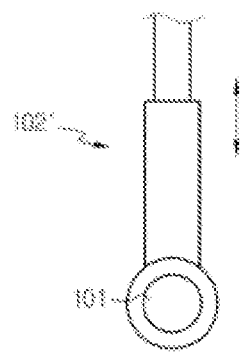
FIG. 3 is a side view showing another example of the connector shown in FIG. 3.

The connector 102 functions as mechanically connecting the keyboard body 100 to the main body 200 such that the keyboard body 100 can be selectively connected to or disconnected from the main body 200. For this configuration, the connector 102 is formed in a strip shape or a rod shape, with one end is fixed to the hinge unit 101, such that it can be inserted into the main body 200 or into the rear side through one side (e.g. the lower edge) of the main body 200. As shown in FIG. 3, a connector 102' may be a multistep pipe composed of a plurality of pipes having different diameters, with one end fixed to the hinge unit 101 and the other end fixed to one side (e.g. the lower edge) of the main body 200, to be adjustable in length.

Though not shown in the figures, a hinge structure is provided at one side of the connector 102 to substantially hinge-couple the keyboard body 100 with the main body 200.

Although it is preferable to use a common USB cable as an interface for transmitting data between the keyboard body 100 and the main body 200, this configuration is not limitative and various technologies known in the art can be obviously used.

Next, the operation of a swing-type foldable keyboard according to a preferred embodiment of the present invention is described with reference to FIG. 2.

When using the keyboard, a user has to pull and separate first the keyboard body 100 from the main body 200, as shown in FIG. 2A. At this time, the main body 200 and the keyboard body 100 are spaced with the connection maintained by the connector 102.

Thereafter, as the two keyboard pieces 100a, 100b of the keyboard body 100 are developed to the left and right, as shown in FIG. 2B, the keyboard pieces 100a, 100b are turned at the joint angle θ of 180° with the width and the length exchanged, such that they are fully developed and the keyboard with the keys arranged is achieved, as shown in FIG. 2C. In this operation, it is possible to closely contact and stably fix the width of the keyboard body 100 to the lower edge of the main body 200 by appropriately adjusting the length of the connector 102.

Though not shown in the figures, it is preferable to use a structure fitting a protrusion in a hole between the keyboard body 100 and the main body 200 in order to stably maintain the developed position.

Figure 4:
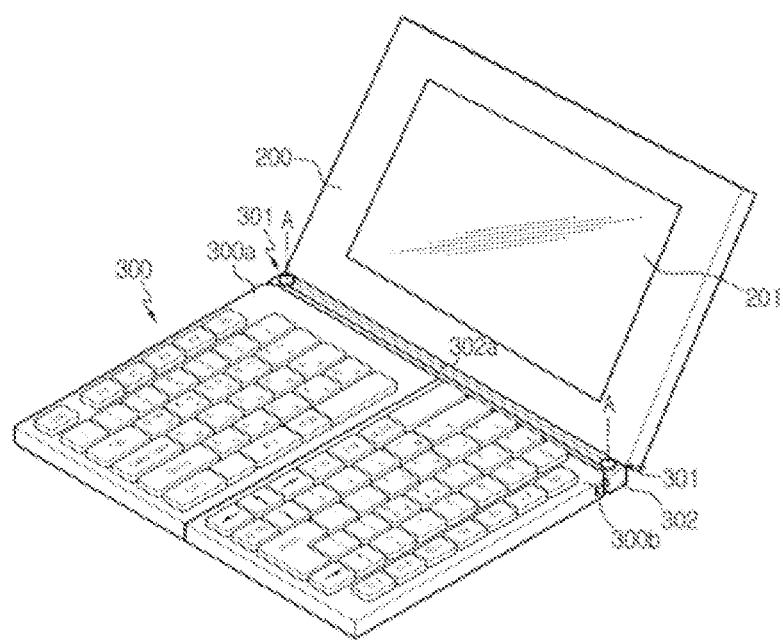
FIG. 4 is a perspective view showing the configuration of a sliding-typed foldable keyboard according to another preferred embodiment of the present invention.
Figure 5:
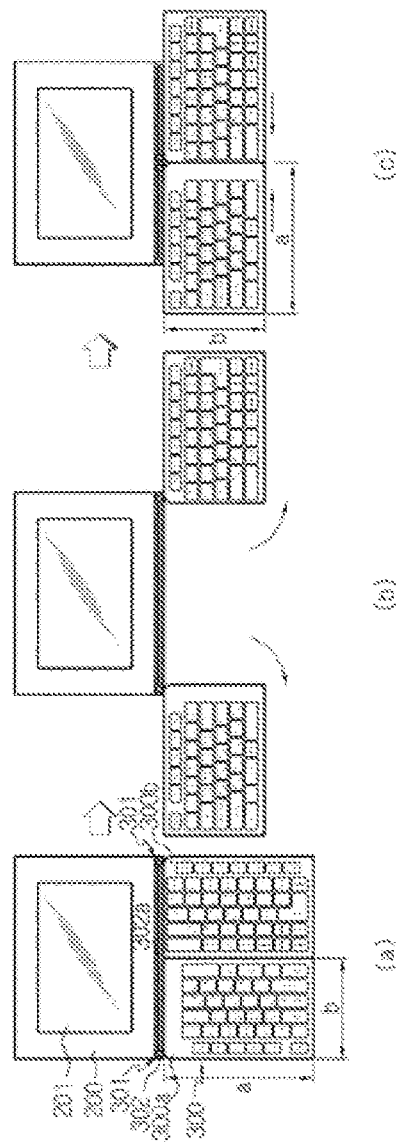
FIG. 5 is a plan view illustrating the operation of the sliding-typed foldable keyboard shown in FIG. 4.

FIGS. 4 and 5 show the configuration and the operational principle of a sliding-typed foldable keyboard according to another embodiment of the present invention.

Referring to FIGS. 4 and 5, a sliding-typed foldable keyboard according to a preferred embodiment of the present invention includes: a guide 302 fixed to a main body 200 of a portable computer; and a keyboard body 300 composed of two keyboard pieces 300a, 300b respectively hinge-coupled to the guide 302 to be developed in parallel with the keyboard surface and connected in the length direction of the guide 302. In this configuration, the keyboard surface implies a plane of the keyboard where a plurality of keys is concentrated, including Korean/English character keys, number keys, symbol keys, and function keys.

Although a structure in which the main body 200 of the portable computer is provided at a display unit 201 and the foldable keyboard is connected to the main body 200 is shown in the figures, the present invention is not limited thereto and may be modified such that the configuration of the main body 200 is mounted on the keyboard body 100 and the keyboard body 300 is connected to the display unit 201. Hereinafter, the configuration of the present invention is described by way of an example when the main body 200 is provided at the display unit 201.

The guide 302 has a length corresponding to the lower edge of the main body 200, in which a slot is longitudinally formed. The guide 302 can be removably connected to the main body 200 or may be integrally formed with the main body 200 as a portion of the main body 200 in another embodiment.

The two keyboard pieces 300a, 300b of the keyboard body 300 are respectively hinge-coupled to the guide 302 at the outer corners, by different hinge units 301. In this configuration, the direction of the hinge axis A of the hinge unit 301 is parallel with a normal of the keyboard surface, such that the two keyboard pieces 300a, 300b are developed in parallel with the keyboard surface.

The keyboard pieces 300a, 300b are fully developed while turning with respect to the hinge units 301, respectively. Therefore, the width and length are exchanged after the keyboard pieces 300a, 300b are developed. That is, when the width and length of the keyboard pieces 300a, 300b are 'b' and 'a', respectively, before developing, the width and the length of the keyboard pieces 300a, 300b become 'a' and 'b', respectively.

Figure 6:
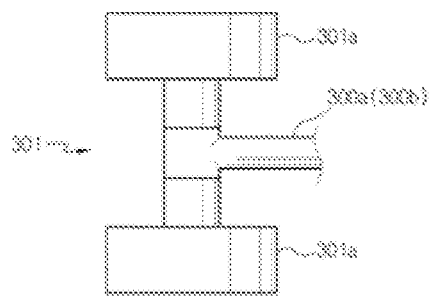
FIG. 6 is a side view showing an example of the hinge unit shown in FIG. 5.

The two hinge units 301 for the two keyboard pieces 300a, 300b are inserted in the slot 302a of the guide 302 to be slidable along the slot 302a. As shown in FIG. 6, it is preferable that the hinge 301 has heads 301a at both ends, in which the head has a diameter larger than the shaft diameter corresponding to the width of the slot 302a and slides on the surface of the guide 301.

The two keyboard pieces 300a, 300b of the keyboard body 300 are formed in substantially rectangles having the same area. Therefore, the entire width of the keyboard that is fully developed with respect to the hinge units 301 and slide to be in contact is two times the entire length of the keyboard fully folded.

Though not shown in the figure, the keyboard body 300 and the guide 302 or the guide 302 and the main body 200 may be hinge-coupled. Further, a predetermined long groove may be formed at the edges contacting the main body 200 of the keyboard pieces 300a, 300b, for strong connection with the main body 200. Further, in the two keyboard pieces 300a, 300b, a predetermined pattern of prominences and depressions may be formed at the edges facing each other in close contact to be engaged with each other, in order to stably maintain the connection between the keyboard pieces when using the keyboard.

Although it is preferable to use a common USB cable as an interface for transmitting data between the keyboard body 300 and the main body 200, this configuration is not limitative and various technologies known in the art can be obviously used.

Hereafter, the operation of the sliding-typed foldable keyboard according to a preferred embodiment is described with reference to FIG. 5.

As shown in (a) of FIG. 5, with the keyboard fully folded, as a user fully develops the two keyboard pieces 300a, 300b of the keyboard body 300 to the left and right, the keyboard pieces 300a, 300b are turned with respect to the hinge units 301 and developed with the width and length exchanged, as shown in (b) of FIG. 5.

Thereafter, as the two keyboard pieces 300a, 300b are moved toward each other, the hinge units 301 of the keyboard pieces 300a, 300b slide along the slot 302a of the guide 302, and as shown in (c) of FIG. 5, the edges facing each other of the keyboard pieces 300a, 300b are in close contact with each other, thereby achieving a keyboard with the keys arranged.

Although the present invention was described with limitative embodiments and the drawings in the above, the present invention is not limited thereto and may be modified and changed by those skilled in the art in various ways within the spirit of the present invention and a range that is equivalent to those described in the following claims.

INDUSTRIAL APPLICABILITY

According to the present invention, it is possible to expand and use a small keyboard for a portable computer, such as UMPC, such that it is easy to input data. Further, since a keyboard is integrally connected with a portable computer by hinge units, it is possible to easily handle the computer and easily apply the present invention to portable computers with a wide screen.

Further, it is possible to achieve a thin portable computer, because the thickness of the keyboard is kept constant even if the keyboard is developed.

What is claimed is:

1. A foldable keyboard for a portable computer, comprising:
   a keyboard body including two keyboard pieces hinge-coupled to each other via a hinge unit to be developed to a left and right in parallel with a keyboard surface, wherein the two keyboard pieces are hinge-coupled such that a width and length thereof are exchanged in developing;
   a rod structure having one end fixed to the hinge unit and the other end moving in a main body of the portable computer or moving on a surface of the main body of the portable computer in developing of the two keyboard pieces, wherein the rod structure physically supports the two keyboard pieces in developing thereof.

2. The foldable keyboard for a portable computer according to claim 1, wherein the two keyboard pieces of the keyboard body are formed in substantially rectangles having the same area, such that an entire width of the keyboard that is fully rectangles having developed with respect to the hinge unit is two times the entire length of the keyboard fully folded.

3. The foldable keyboard for a portable computer according to claim 2, wherein the two keyboard pieces of the keyboard body are hinge-coupled, with corners facing each other connected by the hinge unit.

4. A foldable keyboard for a portable computer, comprising:
   a keyboard body including two keyboard pieces hinge-coupled to each other via a hinge unit to be developed to a left and right in parallel with a keyboard surface, wherein the keyboard pieces are hinge-coupled such that a width and length thereof are exchanged in developing; and
   a multistep pipe having one end fixed to the hinge unit and the other end fixed to one side of a main body of the portable computer,
   wherein the multistep pipe is adjustable in length in developing the keyboard pieces.

5. The foldable keyboard for a portable computer according to claim 4, wherein the two keyboard pieces of the keyboard body are formed in substantially rectangles having the same area, such that the entire width of the keyboard that is fully developed with respect to the hinge unit is two times the entire length of the keyboard fully folded.

6. The portable computer according to claim 5, wherein the two keyboard pieces of the keyboard body are hinge-coupled, with corners facing each other connected by the hinge unit.

7. A foldable keyboard for a rectangular portable computer, comprising:
   a guide having an elongate straight slot formed therein, the slot having a length substantially corresponding to an entire length of one edge of the computer; and
   a keyboard body including two keyboard pieces hinge-coupled to the guide via hinge units respectively so as to be developed to a left and right in parallel with a keyboard surface,
   wherein the hinge units are coupled to the guide so as to move along the slot such that a width and the length of the keyboard pieces are exchanged in developing thereof.

8. The foldable keyboard for a rectangular portable computer according to claim 7, wherein the guide is coupled to a lower edge of the portable computer.

9. The foldable keyboard for a rectangular portable computer according to claim 7, wherein two keyboard pieces of the keyboard body are formed in substantially rectangles having the same area, such that an entire width of the keyboard that is fully developed with respect to the hinge units is two times the entire length of the keyboard fully folded.

10. The foldable keyboard for a rectangular portable computer according to claim 9, wherein outer corners of the two keyboard pieces are connected to the hinge units.

11. The foldable keyboard for a rectangular portable computer according to claim 10, wherein a head having a diameter larger than a width of the slot is formed at both ends of each of the hinge units.

12. The portable computer according to claim 7, wherein the two keyboard pieces of the keyboard body are formed in substantially rectangles having the same area.

13. A portable computer comprising:
   a rectangular main body; and
   a foldable keyboard coupled to the main body,
   wherein the main body has a guide formed at one side thereof, the guide having an elongate straight slot formed therein, the slot having a length substantially corresponding to an entire length of the side of the main body,
   wherein the keyboard body includes two keyboard pieces hinge-coupled to the guide via hinge units respectively so as to be developed to a left and right in parallel with a keyboard surface,
   wherein the hinge units are coupled to the guide so as to move along the slot such that a width and length of the keyboard pieces are exchanged in developing thereof.

14. The portable computer according to claim 13, wherein the two keyboard pieces of the keyboard body are formed in substantially rectangles having the same area.

15. The portable computer according to claim 13, wherein a head having a diameter larger than a width of the slot is formed at ends of the hinge units.

16. A foldable keyboard for a portable computer, comprising:
   a keyboard body including two keyboard pieces hinge-coupled to each other via a hinge unit to be developed to a left and right in parallel with a keyboard surface, wherein the keyboard pieces are hinge-coupled such that a width and length thereof are exchanged in developing; and
   a rod structure having one end fixed to the hinge unit,
   wherein the rod structure physically supports the keyboard pieces in developing thereof.

* * * * *